United States Patent
Seo (10) Patent No.: US 6,846,566 B2
(45) Date of Patent: Jan. 25, 2005

(54) TRANSPARENT CONDUCTIVE LAYER COMPOSITION, TRANSPARENT CONDUCTIVE LAYER FORMED OF THE COMPOSITION, AND IMAGE DISPLAY HAVING THE TRANSPARENT CONDUCTIVE LAYER

(75) Inventor: Kangil Seo, Suwon (KR)

(73) Assignee: Samsung SDI Co., Ltd., Suwon (KR)

( * ) Notice: Subject to any disclaimer, the term of this patent is extended or adjusted under 35 U.S.C. 154(b) by 36 days.

(21) Appl. No.: 10/340,629

(22) Filed: Jan. 13, 2003

(65) Prior Publication Data

US 2003/0215651 A1 Nov. 20, 2003

(30) Foreign Application Priority Data

May 16, 2002 (KR) ........................................ 2002-27068

(51) Int. Cl.⁷ .......................... B32B 15/02; H01B 1/22; H01B 1/24
(52) U.S. Cl. ....................... 428/403; 428/447; 428/450; 252/500; 252/512; 252/519.1; 252/519.31; 252/521.3; 252/521.6
(58) Field of Search ................................ 428/403, 447, 428/450; 252/500, 512, 519.1, 519.31, 521.3, 521.6

(56) References Cited

U.S. PATENT DOCUMENTS

| | | | | |
|---|---|---|---|---|
| 5,514,466 A | * | 5/1996 | Yamada et al. | 428/328 |
| 6,086,790 A | * | 7/2000 | Hayashi et al. | 252/500 |
| 6,136,228 A | | 10/2000 | Hirai et al. | |
| 6,136,444 A | * | 10/2000 | Kon et al. | 428/423.1 |
| 6,180,030 B1 | | 1/2001 | Hirai et al. | |
| 6,319,594 B1 | * | 11/2001 | Suzuki et al. | 428/208 |
| 6,689,458 B1 | * | 2/2004 | Mikoshiba et al. | 428/339 |
| 6,716,480 B2 | * | 4/2004 | Yukinobu et al. | 427/108 |
| 2003/0071794 A1 | * | 4/2003 | Arakawa et al. | 345/173 |

FOREIGN PATENT DOCUMENTS

| | | | | |
|---|---|---|---|---|
| JP | 10-188681 | | 7/1998 | |
| KR | 1998-025037 | | 7/1998 | |
| WO | WO 9605606 A1 | * | 2/1996 | ............ H01J/29/38 |

* cited by examiner

Primary Examiner—Jeffrey B. Robertson
(74) Attorney, Agent, or Firm—Leydig, Voit & Mayer, Ltd.

(57) ABSTRACT

A transparent conductive layer composition, a transparent conductive layer formed of the composition, an image display having the transparent conductive layer are provided. The transparent conductive layer composition contains a composition for a conductive layer and a composition for a transparent coating layer formed on the conductive layer. The transparent coating layer composition includes an amino compound, such as 3-aminopropyltrimethoxysilane, 3-aminopropylmethyldimethoxysilane, N-(6-aminoethyl)-3-aminopropyltrimethoxysilane, and p-aminophenyltrimethoxysilane, a metal compound, such as tetraethyl orthosilicate, and a polar solvent. The transparent conductive layer formed of the composition has a low resistance and strong film hardness and is less reflective and cost effective. The transparent conductive layer can be used on the front panel surface of an electrical image display device, including a cathode ray tube, a vacuum fluorescent display, a plasma display, and a liquid crystal display, to effectively shield electromagnetic waves and an electromagnetic field formed due to the emission of electromagnetic waves.

31 Claims, 1 Drawing Sheet

TRANSPARENT CONDUCTIVE LAYER COMPOSITION, TRANSPARENT CONDUCTIVE LAYER FORMED OF THE COMPOSITION, AND IMAGE DISPLAY HAVING THE TRANSPARENT CONDUCTIVE LAYER

BACKGROUND OF THE INVENTION

This application claims the priority of Korean Patent Application No. 2002-27068, filed May 16, 2002, in the Korean Intellectual Property Office, the disclosure of which is incorporated herein in its entirety by reference.

1. Field of the Invention

The present invention relates to a transparent conductive layer composition, and more particularly, to a transparent conductive layer composition having anti-reflective and electromagnetic wave-shielding properties, a transparent conductive layer formed of the composition, and an image display having a front panel formed by coating the transparent conductive layer.

2. Description of the Related Art

In the prior art, an anti-static, anti-reflective, thin transparent layer for reducing electric charges and reflection has been coated on a transparent display panel of a cathode ray tube (CRT), a vacuum fluorescent display (VFD), or a liquid crystal display (LCD).

The growing concern over effects of electromagnetic waves on the human body necessitates shielding electromagnetic waves and an electromagnetic field produced therefrom as well as the anti-static function in display devices. As an example, when a thin conductive layer for shielding electromagnetic waves is formed on a panel surface of a display, for example, a CRT, the sheet resistance of the electromagnetic wave-shielding conductive layer should be as low as $10^2–10^4$ $\Omega/cm^2$, while an antistatic conductive layer needs a sheet resistance of about $10^7$ $\Omega/cm^2$.

When a coating composition containing conductive oxide, such as antimony-doped tin oxide or tin-doped indium oxide, is applied to form a thin conductive layer having a low sheet resistance, the thickness of the thin conductive layer should be greater than conventional conductive layers. In this case, the anti-reflective function cannot be expected from the thin conductive layer. Accordingly, it is impractical to form an electromagnetic wave-shielding and anti-reflective conductive layer using a conductive oxide such as the antimony-doped tin oxide and tin-doped indium oxide.

In another method for forming a low sheet resistance thin conductive layer, a conductive layer coating composition containing metal micro-particles, such as silver micro-particles, is applied to the surface of a substrate. In this method, in order to improve the dispersion properties of the metal micro-particles, an organic stabilizer, such as polyvinyl alcohol, polyvinyl pyrrolidone gelatin, is incorporated into the thin conductive layer coating composition.

However, due to the organic stabilizer used in the thin conductive layer coating composition, the metal micro-particles become close and interact in the thin conductive layer, thereby increasing grain boundary resistance. As a result, the sheet resistance of the conductive layer cannot be lowered. For this reason, it is required to decompose and remove the organic stabilizer from the conductive layer by heating at a high temperature of about 400° C.

However, heating the conductive layer at such a high temperature in order to decompose and remove the organic stabilizer causes the metal micro-particles to dissolve and agglomerate, thereby degrading the transparency of the thin conductive layer. In particular, if the transparent conductive layer contains silver micro-particles, the metal micro-particles grow due to the oxidization and ionization of the metal, and the thin conductive layer corrodes, thereby lowering the conductivity and light transmittance of the thin conductive layer. Therefore, the performance of an image display having the conductive layer is unreliable.

A solution, suggested by Korean Laid-open Patent Publication No. 98-25037, uses a transparent conductive layer containing composite metal micro-particles having an average particle diameter of 1–200 nm on a substrate and a transparent coating layer on the transparent conductive particle layer, which has a refractive index smaller than the transparent conductive layer.

However, this transparent conductive layer has problems in practical use since the metal micro-particles in the transparent conductive layer is oxidized due to moisture or oxygen in the air. In addition, the use of expensive metal micro-particles increases the manufacturing cost of the transparent conductive layer. Further, the properties of the transparent conductive layer associated with the sheet resistance need improvement.

SUMMARY OF THE INVENTION

Accordingly, the invention provides a transparent conductive layer composition providing improved sheet resistance properties, a transparent conductive layer formed of the composition, a method for forming the transparent conductive layer, and an image display having improved anti-reflective and electromagnetic wave-shielding properties by using the transparent conductive layer.

In one aspect, the invention provides a composition for a transparent conductive layer including a conductive layer and a transparent coating layer formed on the conductive layer, wherein a transparent coating layer composition for the transparent coating layer comprises an amine compound having one of formula (1) and (2) below, a metal compound having formula (3) below, and a polar solvent:

$$R_1(NH_2)_n \qquad (1)$$

where n is an integer of 1 or 2, $R_1$ is selected from the group consisting of $C_1$–$C_{20}$ alkyl groups, a phenyl group, $C_2$–$C_{20}$ alkenyl groups, $C_1$–$C_{20}$ alkyl groups with a hydroxy group, and —$(CH_2)_kSO_3H$, where k is an integer from 1 to 10, $$(R_2O)_x-Si(OR_3)_{3-x}-R_4 \qquad (2)$$

where x is an integer from 1 to 3, $R_2$ and $R_3$ are each independently selected from the group consisting of $C_1$–$C_{20}$ alkyl groups and a phenyl group, and $R_4$ is selected from the group consisting of $C_1$–$C_{20}$ alkyl groups with a substituted or unsubstituted amino group, a phenyl group with a substituted or unsubstituted amino group, and $C_6$–$C_{50}$ aryl groups with a substituted or unsubstituted amino group, (3)

where M is selected from the group consisting of silicon, titanium, tin, and zirconium; $R_6$ is a $C_1$–$C_{20}$ alkyl group or —$M(R_{12}R_{13}R_{14})$, where $R_{12}$, $R_{13}$, and $R_{14}$ are each independently selected from the group consisting of $C_1$–$C_{20}$ alkyl groups, $C_1$–$C_{20}$ alkoxy groups, and $C_6$–$C_{20}$ aryl groups; $R_7$ is a $C_1$–$C_{20}$ alkyl group; $R_8$ and $R_9$ are selected from the group consisting of $C_1$–$C_{20}$ alkyl groups, $C_1$–$C_{20}$ alkoxy groups, $C_2$–$C_{20}$ alkenyl groups, and $C_6$–$C_{20}$ aryl groups, at least one of $R_8$ and $R_9$ being a $C_1$–$C_{20}$ alkoxy group; $R_{10}$ and $R_{11}$ are selected from the group consisting of $C_1$–$C_{20}$ alkyl groups, $C_2$–$C_{20}$ alkenyl groups, and $C_6$–$C_{20}$ aryl groups, at least one of $R_{10}$ and $R_{11}$ is a $C_1$–$C_{20}$ alkoxy group; and n is an integer from 0 to 20.

The transparent coating layer composition further comprises a mercapto compound having one of formula (4) and (5) below:

$$R_{15}SH \quad (4)$$

where $R_{15}$ is selected from the group consisting of $C_1$–$C_{20}$ alkyl groups, $C_1$–$C_{20}$ alkyl groups with a hydroxy group, hydroxy-substituted $C_1$–$C_{20}$ hydroxyalkyl groups, and —$(CH_2)_kCOOH$, where k is an integer from 1 to 10, $$R_{16}O-\underset{\underset{R_{18}}{|}}{\overset{\overset{R_{17}}{|}}{M}}-R_{19} \quad (5)$$

where $R_{16}$ is a $C_1$–$C_{20}$ alkyl group, $R_{17}$ and $R_{18}$ are each independently selected from the group consisting of $C_1$–$C_{20}$ alkyl groups, $C_1$–$C_{20}$ alkoxy groups, and $C_1$–$C_{20}$ alkyl groups with a mercapto group, and $R_{19}$ is a $C_1$–$C_{20}$ alkyl group with a mercapto group.

In another aspect, the invention provides a transparent conductive layer comprising: a product obtained by coating and thermally treating a transparent coating layer composition containing an amine compound having one of formula (1) and (2) above, a metal compound having formula (3) above, and a polar solvent; and a product obtained by coating and drying a conductive layer composition containing at least one of metal and metal oxide having an average particle diameter of 5–5000 nm and a polar solvent.

The transparent conductive layer according to the present invention can be formed in a single-layered structure or a dual-layered structure including the conductive layer and the transparent coating layer on the conductive layer. The transparent coating layer of the dual-layered transparent conductive layer is formed by coating and thermally treating the transparent coating layer composition containing the amine compound having one of formula (1) and (2) above, the metal compound having formula (3) above, and the polar solvent. The conductive layer of the dual-layered transparent conductive layer is formed by coating and drying the conductive layer composition containing the at least one of metal and metal oxide having an average particle diameter of 5–5000 nm and the polar solvent.

In another aspect, the invention provides a method for forming a transparent conductive layer, the method comprising: forming a conductive layer by coating and drying a conductive layer composition containing at least one of metal and metal oxide having an average particle diameter of 5–5000 nm and a polar solvent; and forming a transparent coating layer by coating and thermally treating a transparent coating layer composition containing an amine compound having one of formula (1) and (2) above, a metal compound having formula (3) above, and a polar solvent.

In another aspect, the invention provides an image display having the above-described transparent conductive layer.

BRIEF DESCRIPTION OF THE DRAWINGS

The above features and advantages of the present invention will become more apparent by describing in detail exemplary embodiments thereof with reference to the attached drawings in which.

DETAILED DESCRIPTION OF THE INVENTION

A transparent conductive layer according to the present invention is formed by sequentially stacking a high refractive index conductive layer (hereinafter, simply "conductive layer") and a transparent coating layer having a lower refractive index than the conductive layer. Formation of the transparent coating layer involves mixing an amine compound having formula 1 or 2 below, which interacts with nano-sized metal or metal oxide particles contained in the conductive layer, with a metal compound having formula 3 below (alternatively, further with a mercapto compound having formula 4 or 5 below), coating the mixture on the conductive layer, and thermally treating the coated mixture. The amine compound and the mercapto compound form a network structure by reacting with the metal compound having formula 3 below, and particularly, silicon alkoxide, to enhance the strength of the transparent conductive layer. Through the interaction with the metal or metal oxide particles the amine compound and the mercapto compound prevent oxidation of the metal oxide in the conductive layer and enhance the reducibility of the metal oxide.

$$R_1(NH_2)_n \quad (1)$$

In formula (1) above, n is an integer of 1 or 2, $R_1$ is selected from the group consisting of $C_1$–$C_{20}$ alkyl groups, a phenyl group, $C_2$–$C_{20}$ alkenyl groups, $C_1$–$C_{20}$ alkyl groups with a hydroxy group, and —$(CH_2)_kSO_3H$, where k is an integer from 1 to 10.

$$(R_2O)_x-Si(OR_3)_{3-x}-R_4 \quad (2)$$

In formula (2) above, x is an integer from 1 to 3, $R_2$ and $R_3$ are each independently selected from the group consisting of $C_1$–$C_{20}$ alkyl groups and a phenyl group, and $R_4$ is selected from the group consisting of $C_1$–$C_{20}$ alkyl groups with a substituted or unsubstituted amino group, a phenyl group with a substituted or unsubstituted amino group, and $C_6$–$C_{50}$ aryl groups with a substituted or unsubstituted amino group.

$$R_6O\left[\underset{\underset{R_{11}}{|}}{\overset{\overset{R_{10}}{|}}{M}}-O\right]_n\underset{\underset{OR_7}{|}}{\overset{\overset{R_9}{|}}{M}}-R_8 \quad (3)$$

In formula (3) above, M is selected from the group consisting of silicon (Si), titanium (Ti), tin (Sn), and zirconium (Zr); $R_6$ is a $C_1$–$C_{20}$ alkyl group or —$M(R_{12}R_{13}R_{14})$, where $R_{12}$, $R_{13}$, and $R_{14}$ are each independently selected from the group consisting of $C_1$–$C_{20}$ alkyl groups, $C_1$–$C_{20}$ alkoxy groups, and $C_6$–$C_{20}$ aryl groups; $R_7$ is a $C_1$–$C_{20}$ alkyl group; $R_8$ and $R_9$ are selected from the group consisting of $C_1$–$C_{20}$ alkyl groups, $C_1$–$C_{20}$ alkoxy groups, $C_2$–$C_{20}$ alkenyl groups, and $C_6$–$C_{20}$ aryl groups, at least one of $R_8$ and $R_9$ being a $C_1$–$C_{20}$ alkoxy group; $R_{10}$ and $R_{11}$ are selected from the group consisting of $C_1$–$C_{20}$ alkyl groups, $C_2$–$C_{20}$ alkenyl groups, and $C_6$–$C_{20}$ aryl groups, at least one of $R_{10}$ and $R_{11}$ is a $C_1$–$C_{20}$ alkoxy group; and n is an integer from 0 to 20.

$$R_{15}SH \qquad (4)$$

In formula (4) above, $R_{15}$ is selected from the group consisting of $C_1$–$C_{20}$ alkyl groups, $C_1$–$C_{20}$ alkyl groups with a hydroxy group, hydroxy-substituted $C_1$–$C_{20}$ hydroxyalkyl groups, and —$(CH_2)_k COOH$, where k is an integer from 1 to 10.

In formula (5) above, $R_{16}$ is a $C_1$–$C_{20}$ alkyl group, $R_{17}$ and $R_{18}$ are each independently selected from the group consisting of $C_1$–$C_{20}$ alkyl groups, $C_1$–$C_{20}$ alkoxy groups, and $C_1$–$C_{20}$ alkyl groups with a mercapto (—SH) group, and $R_{19}$ is a $C_1$–$C_{20}$ alkyl group with a mercapto group.

A transparent conductive layer composition according to the present invention is prepared by mixing a composition for the conductive layer and a composition for the transparent coating layer.

The conductive layer composition according to the present invention includes metal oxide and/or metal particles having an average diameter of 5–5000 nm and a polar solvent. The metal oxide particles are derived from at least one selected from the group consisting of tin-doped indium oxide (ITO), antimony-doped tin oxide (ATO), titanium oxide, and ruthenium oxide. The metal particles are derived from at least one selected from the group consisting of gold (Au), silver (Ag), palladium (Pd), platinum (Pt), rhodium (Rh), ruthenium (Ru), copper (Cu), iron (Fe), nickel (Ni), cobalt (Co), tin (Sn), titanium (Ti), indium (In), aluminium (Al), tantalum (Ta), and antimony (Sb). If the average diameter of the metal oxide or metal particles is beyond the above range, the resulting conductive layer becomes opaque. The amount of the metal oxide or metal particles is in the range of 0.01–20 parts by weight based on 100 parts of the conductive layer composition by weight. If the amount of the metal oxide or metal particles exceeds 20 parts by weight, the conductive layer becomes opaque. If the amount of the metal oxide or metal particles is less than 0.01 parts by weight, a desired level of sheet resistance cannot be attained. If the average diameter of the metal oxide or metal particles is less than 5 nm, the conductivity of the resulting layer decreases. If the average diameter of the metal oxide or metal particles is greater than 5000 nm, the dispersion of the particles in the polar solvent becomes poor.

Examples of the polar solvent for dispersing the metal oxide or metal particles include water, ethanol, methanol, butanol, methylcellosolve, and isopropylcellosolve. The amount of the polar solvent is in the range of 80–99.99 parts by weight based on 100 parts of the conductive layer composition by weight. If the amount of the polar solvent exceeds 99.99 parts by weight, a desired level of sheet resistance cannot be attained. If the amount of the polar solvent is less than 80 parts by weight, coating properties degrade.

The conductive layer composition optionally further includes a colorant. In this case, the transmittance and color of the conductive layer can be varied easily using the colorant. The amount of the colorant is appropriately adjusted according to the desired transmittance of the conductive layer.

It is preferable that the amount of the colorant be in the range of 0.01–10 parts by weight based on 100 parts of the solid content by weight in the conductive layer composition. If the amount of the colorant is less than 0.01 parts by weight, there is no coloring effect. If the amount of the colorant exceeds 10 parts by weight, the transmittance of the conductive layer degrades, and poor resolution may result.

Examples of the colorant include carbon black, graphite, titan black, TiN, $TiO_{1-x}N_x$, where $0<x<1$, TiC, TiN—TiC, cobalt oxide, zinc oxide, iron oxide, ruthenium oxide, aluminium oxide, metallic complex azo dye, metallic complex anthraquinon dye, and a mixture of at least two of the forgoing materials. Among these materials, carbon black and titan black, which provide high color purity, are more preferable, with titan black being most preferable.

The transparent coating layer composition according to the present invention includes an amine compound having formula (1) or (2) below, a metal compound having formula (3) below, and a polar solvent.

$$R_1(NH_2)_n \qquad (1)$$

In formula (1) above, n is an integer of 1 or 2, $R_1$ is selected from the group consisting of $C_1$–$C_{20}$ alkyl groups, a phenyl group, $C_2$–$C_{20}$ alkenyl groups, $C_1$–$C_{20}$ alkyl groups with a hydroxy group, and —$(CH_2)_k SO_3H$, where k is an integer from 1 to 10.

$$(R_2O)_x—Si(OR_3)_{3-x}—R_4 \qquad (2)$$

In formula (2) above, x is an integer from 1 to 3, $R_2$ and $R_3$ are each independently selected from the group consisting of $C_1$–$C_{20}$ alkyl groups and a phenyl group, and $R_4$ is selected from the group consisting of $C_1$–$C_{20}$ alkyl groups with a substituted or unsubstituted amino group, a phenyl group with a substituted or unsubstituted amino group, and $C_6$–$C_{50}$ aryl groups with a substituted or unsubstituted amino group.

In formula (3) above, M is selected from the group consisting of silicon (Si), titanium (Ti), tin (Sn), and zirconium (Zr); $R_6$ is a $C_1$–$C_{20}$ alkyl group or —$M(R_{12}R_{13}R_{14})$, where $R_{12}$, $R_{13}$, and $R_{14}$ are each independently selected from the group consisting of $C_1$–$C_{20}$ alkyl groups, $C_1$–$C_{20}$ alkoxy groups, and $C_6$–$C_{20}$ aryl groups; $R_7$ is a $C_1$–$C_{20}$ alkyl group; $R_8$ and $R_9$ are selected from the group consisting of $C_1$–$C_{20}$ alkyl groups, $C_1$–$C_{20}$ alkoxy groups, $C_2$–$C_{20}$ alkenyl groups, and $C_6$–$C_{20}$ aryl groups, at least one of $R_8$ and $R_9$ being a $C_1$–$C_{20}$ alkoxy group; $R_{10}$ and $R_{11}$ are selected from the group consisting of $C_1$–$C_{20}$ alkyl groups, $C_2$–$C_{20}$ alkenyl groups, and $C_6$–$C_{20}$ aryl groups, at least one of $R_{10}$ and $R_{11}$ is a $C_1$–$C_{20}$ alkoxy group; and n is an integer from 0 to 20.

The transparent coating layer composition according to the present invention optionally further includes a mercapto compound having formula 4 or 5 below.

In formula (4) above, $R_{15}$ is selected from the group consisting of $C_1$–$C_{20}$ alkyl groups, $C_1$–$C_{20}$ alkyl groups with a hydroxy group, hydroxy-substituted $C_1$–$C_{20}$ hydroxyalkyl groups, and —$(CH_2)_k$COOH, where k is an integer from 1 to 10.

In formula (5) above, $R_{16}$ is a $C_1$–$C_{20}$ alkyl group, $R_{17}$ and $R_{18}$ are each independently selected from the group consisting of $C_1$–$C_{20}$ alkyl groups, $C_1$–$C_{20}$ alkoxy groups, and $C_1$–$C_{20}$ alkyl groups with a mercapto group (—SH), and $R_{19}$ is a $C_1$–$C_{20}$ alkyl group with a mercapto group.

Regarding formula (1) above, examples of $R_1$ include an ethyl group, —$CH_2CH_2CH_2OH$, an ethenyl group, a propenyl group, —$CH_2CH(OH)CH_3$, —$CH(CH_3)CH_2OH$, —$(CH_2)_3SO_3H$, and —$C_6H_5SO_3H$.

Regarding formula (2) above, examples of $R_2$ and $R_3$ include —$CH_3$, —$CH_2CH_3$, and —$(CH_2)_3CH_3$. Examples of $R_4$ include —$CH_2CH_2CH_2NH_2$, —$C_6H_5NH_2$, and a N-(2-aminoethyl)-3-aminopropyl group (—$CH_2CH_2CH_2NHCH_2CH_2NH_2$).

Regarding formula (3) above, examples of $R_6$, $R_7$, $R_8$, $R_9$, $R_{10}$, $R_{11}$, $R_{12}$, $R_{13}$, and $R_{14}$ include a methyl group, an ethyl group, a butyl group, a propyl group, an isopropyl group, a methoxy group, an ethoxy group, a propoxy group, an isopropoxy group, butoxy group, a vinyl group, and a phenyl group.

Regarding formula (4) above, examples of $R_{15}$ include a methyl group, an ethyl group, a butyl group, a propyl group, —$CH_2CH(OH)CH_2CH_3$, —$CH_2CH_2CH_2CH_2OH$, —$CH_2CH(OH)CH_2OH$, —$CH_2CH_2COOH$, and —$CH_2CH_2CH_2COOH$.

Regarding formula (5) above, examples of $R_{16}$, $R_{17}$, $R_{18}$, and $R_{19}$ include a methyl group, an ethyl group, a propyl group, a butyl group, a methoxy group, an ethoxy group, a propoxy group, an isopropoxy group, a butoxy group, a 3-mercaptopropyl group, and a 4-mercaptobutyl group.

According to the present invention, it is preferable that the amount of the amine compound having formula (1) or (2) above be in the range of 0.001–5.0 parts by weight based on 100 parts of the metal compound having formula (3) above by weight. If the amount of the amine compound is less than 0.001 parts by weight, a desired low level of sheet resistance cannot be attained. If the amount of the amine compound exceeds 5.0 parts by weight, film strength (hardness) becomes small. It is preferable that aminosilane compounds, including 3-aminopropyltrimethoxysilane, N-(6-aminoethyl)-3-aminopropyltrimethoxysilane, and p-aminophenyltrimethoxysilanle, organic alcohols, including 2-amino-1-propanol and 1-amino-2-propanol, organic acids, including 3-amino-1-propanesulfonic acid, and diamine compounds, including ethylenediamine and 1,2-diaminopropane, be used for the amine compound having formula (1) or (2) above.

In the metal compound having formula (3) above, composing the transparent coating layer composition according to the present invention, as described above, it is preferable that at least one of $R_{10}$ and $R_{11}$ be a $C_1$–$C_{20}$ alkoxy group and that at least one of $R_8$ and $R_9$ be a $C_1$–$C_{20}$ alkoxy group. This is because such a metal compound can form a three-dimensional silica network structure through hydrolysis and polycondensation.

In the metal compound having formula (3) above, when n is non-zero, it is preferable that n be an integer from 3 to 5.

According to the present invention, examples of the metal compound having formula (3) above include tetraethyl orthosilicate and its oligomers, tetramethylorthosilicate and its oligomers, tetraisopropyl orthosilicate, methyl trimethoxysilicate, dimethyl dimethoxysilicate, vinyltriethoxysilane, phenyltriethoxysilane, and 3-glycidoxypropyltrimethoxysilane.

According to the present invention, the amount of the mercapto compound having formula (4) or (5) is in the range of 0.001–5.0 parts by weight based on 100 parts of the metal compound having formula (3) above by weight. If the amount of the mercapto compound is less than 0.001 parts by weight, a desired low level of sheet resistance cannot be attained. If the amount of the mercapto compound exceeds 5.0 parts by weight, film strength becomes small. It is preferable that mercaptosilane compounds, including mercaptopropyltrimethoxysilane and 3-mercaptopropylmethyldimethoxysilane, organic alcohols, including 3-mercapto-1,2-propanediol and 1-mercapto-2-propanol, and organic acids, including 3-mercaptopropionic acid, be used for the mercapto compound.

The same kinds of polar solvents as for the conductive layer composition described above are used for the polar solvent for the transparent coating layer composition, in which the above-described amine compound and metal compound, and alternatively the mercapto compound, are dissolved and dispersed. It is preferable that the amount of the polar solvent be in the range of 1–10,000 parts by weight based on 1 part of the metal oxide having formula (3) above by weight. If the amount of the polar solvent exceeds 10,000 parts by weight, film hardness is not strong enough. If the amount of the polar solvent is less than 1 part by weight, coating properties become poor.

Like the conductive layer composition, the transparent coating layer composition optionally further includes 0.01–10 parts by weight colorant based on 100 parts of the solid content by weight in the transparent coating layer composition.

Hereinafter, the principles of the present invention will be described.

In an electromagnetic wave-shielding coating containing metal micro-particles, such as silver micro-particles, a certain amount of the metal micro-particles should be contained to provide good resistance properties. The resistance properties of the electromagnetic wave-shielding coating are unstable so that the resistance value changes even after being left only for a day. According to the present invention, the amine compound having formula (1) or (2) above, which is an essential component, and the mercapto compound having formula (4) or (5) above, which is an optional additive, are mixed with the metal compound having formula (3) above and the polar solvent to prepare the transparent coating layer composition. The transparent coating layer composition is coated on the conductive layer formed of metal or metal oxide so that the mercapto or amino group adsorbs the metal particles. Due to the amine group in the amine compound or the mercapto group in the mercapto compound and substituents bound to silicon, all of these groups surrounding the metal, the metal can be protected from being oxidized due to moisture or oxygen in the air. Interactions between the amino or mercapto group and the metal change the structure of the transparent coating layer and thus results in a denser conductive layer with enhanced electrical conductivity. The resulting transparent conductive layer has a low sheet resistance and improved electromagnetic wave-shielding properties.

A method for manufacturing a transparent conductive layer according to the present invention using the transparent conductive layer composition described above will be described.

Initially, the conductive layer composition is prepared by dispersing the metal or metal oxide particles having an average diameter of 5–5000 nm in the polar solvent. Subsequently, the conductive layer composition is coated on a glass panel and dried at a temperature of 30–100° C. to form the conductive layer.

In addition, the transparent coating layer composition is prepared by mixing the polar solvent, the amine compound having formula (1) or (2) above, and the metal compound having formula (3) above together and aging the mixture for a predetermined period of time. The aging process contributes to enhancing film strength and coating properties. Optionally, the mercapto compound having formula (4) or (5) above can be added into the transparent coating layer composition.

Next, the transparent coating layer composition is coated on the conductive layer, dried, and subjected to a thermal treatment to form the transparent conductive layer according to the present invention. At this time, the drying process can be omitted.

It is preferable that the thermal treatment be performed at a temperature in the range of 100–400° C. If the temperature of the thermal treatment is higher than 400° C., the kinds of available thermal treatment equipment are limited. If the temperature of the thermal treatment is less than 400° C., a desired level of film hardness cannot be attained.

Any method can be applied in coating a glass substrate with the conductive layer composition and the transparent coating layer composition without limitations. For example, spin coating and roll coating methods can be used.

Figure 1:
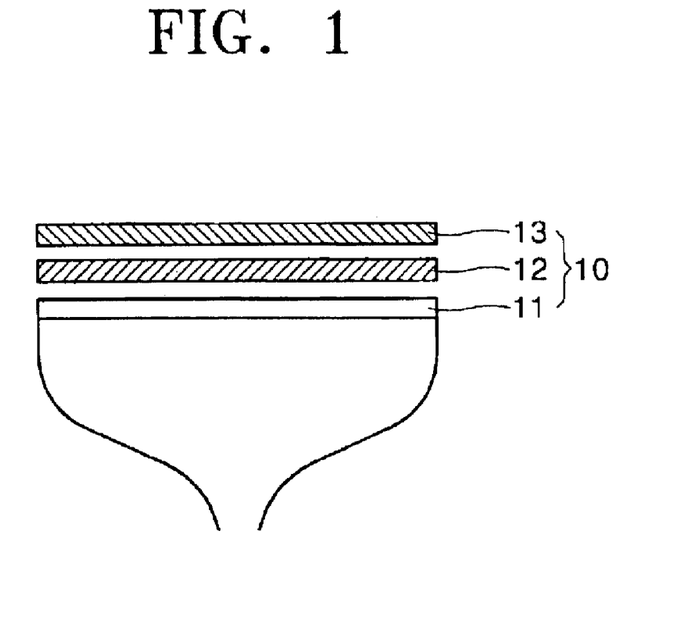
FIG. 1 is a sectional view showing a stacked structure of a transparent conductive layer formed on a cathode ray tube (CRT) panel, according to an embodiment of the present invention.

Referring to FIG. 1, the transparent conductive layer 10 formed through the above-described processes has a stacked structure including the conductive layer 12 on a CRT panel 11 and the transparent coating layer (protective layer) 13 on the conductive layer 12. The conductive layer 12 is formed of a metal oxide or metal and has no binding strength. The conductive layer 12 has a thickness of 50–3000 nm. If the thickness of the conductive layer 12 is smaller than 50 nm, resistance properties become poor. If the thickness of the conductive layer 12 is larger than 3000 nm, moisture resistance becomes poor.

The transparent coating layer 13 formed on the conductive layer 12 contains a hydrolyzed and polycondensated product of the metal compound having a network structure of formula (3) above, preferably, hydrolyzed and polycondensated silicon alkoxide (silica), and at least one of the amine compound having formula (1) and (2) and the hydrolyzed and polycondensated product of the amine compound. Alternatively, the transparent coating layer 13 can further contain at least one of the mercapto compound having formula (4) and (5) above and the hydrolyzed and polycondensated product of the mercapto compound.

The composition of the transparent coating layer 13 enhances the strength of the transparent coating layer 13.

The transparent coating layer 13 has a thickness of 50–200 nm and a refractive index of 1.3–1.5, and is lower than the conductive layer 12 which has a refractive index of 1.5–2.4. If the thickness of the transparent coating layer 13 is less than 50 nm, moisture resistance becomes poor. If the thickness of the transparent coating layer 13 is larger than 200 nm, optical properties, including reflectivity, become poor.

It is preferable that the amount of at least one of the amine compound having formula (1) or (2) above and its hydrolyzed and polycondensated product be in the range of 0.1–100 parts by weight based on 100 parts of the hydrolyzed and polycondensated product of the metal compound having formula 3 above by weight. It is preferable that the amount of at least one of the mercapto compound having formula (4) or (5) above and its hydrolyzed and polycondensated product be in the range of 0.1–100 parts by weight based on 100 parts of the hydrolyzed and polycondensated product of the metal compound having formula (3) above by weight.

Figure 2:
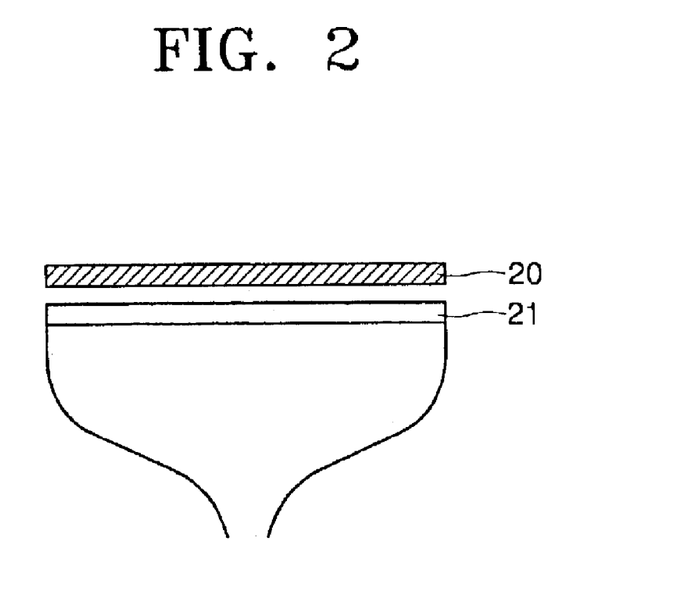
FIG. 2 is a sectional view showing a stacked structure of a transparent conductive layer formed on the CRT panel, according to another embodiment of the present invention.

FIG. 2 is a sectional view showing a stacked structure of a transparent conductive layer formed on a CRT panel, according to another embodiment of the present invention.

Referring to FIG. 2, a transparent conductive layer 20 is formed on a CRT panel 21 as a single coated layer. The transparent conductive layer 20 contains within the single layer a product (a) obtained by coating and thermally treating the transparent coating layer composition containing the amine compound having formula (1) or (2) above, the metal compound having formula (3) above, and the polar solvent, and a product (b) obtained by coating and drying the conductive layer composition containing metal and/or metal oxide particles having an average diameter of 5–5000 nm and the polar solvent.

Since the transparent conductive layers 10 and 20 according to the present invention have a sheet resistance of $10^1$–$10^4$ $\Omega/cm^2$, and more accurately, about $10^3$ $\Omega/cm^2$, the transparent conductive layers 10 and 20 can effectively shield electromagnetic waves and an electromagnetic field formed from the emission of electromagnetic waves when coated on the front panel of an image display.

When light reflection occurs on the front panel of a display, displayed images cannot be seen due to the reflected light. However, in a display according to the present invention whose front panel is coated with the transparent conductive layer capable of preventing reflection of visible and near infrared light, such light reflection can be effectively prevented.

The present invention will be described in greater detail with reference to the following examples. The following examples are for illustrative purposes and are not intended to limit the scope of the invention.

EXAMPLE 1

A conductive layer composition was prepared by adding 10 g of 5% aqueous suspension of Ag/Pd particles having an average particle diameter of 20 nm into a solvent mixture containing 15 g ethanol, 10 g methanol, 10 g isopropyl alcohol, and 5 g n-butanol.

In addition, a transparent coating layer composition was prepared by mixing 2.67 g tetraethyl orthosilicate and 0.08 g 3-aminopropyltrimethoxysilane with a solvent mixture containing 50 g ethanol, 30 g methanol, 10 g isopropyl alcohol, and 7.25 g n-butanol, and aging the mixture at 60° C. for 24 hours.

A substrate was spin coated with the conductive layer composition, followed by drying at 60° C. to form a conductive layer. Subsequently, the transparent coating layer composition was coated on the conductive layer and subjected to a thermal treatment at 200° C. for 30 minutes to form a transparent coating layer. As a result, a complete transparent conductive layer was obtained.

EXAMPLE 2

A transparent conductive layer was formed in the same manner as in example 1 except that the transparent coating layer composition was changed as follows.

2.67 g tetraethyl orthosilicate and 0.08 g N-(6-aminoethyl)-3-aminopropyltrimethoxysilane was mixed with a solvent mixture containing 50 g ethanol, 30 g methanol, 10 g isopropyl alcohol, and 7.25 g n-butanol, and the mixture was aged at 60° C. for 24 hours to prepare the transparent coating layer composition.

EXAMPLE 3

A transparent conductive layer was formed in the same manner as in example 1 except that the conductive layer composition was changed as follows.

A conductive layer composition was prepared by adding 10 g of 5% aqueous suspension of Ag/Pd particles having an average particle diameter of 20 nm into a solvent mixture containing 30 g ethanol, 5 g methanol, and 5 g isopropyl-cellosolve.

COMPARATIVE EXAMPLE 1

A transparent conductive layer was formed in the same manner as in example 1 except that the transparent coating layer composition was prepared as follows.

2.67 g tetraethyl orthosilicate was added into a solvent mixture containing 50 g ethanol, 30 g methanol, 10 g isopropyl alcohol, and 7.25 g n-butanol, followed by pH adjustment using nitric acid to pH 2. The mixture was stirred and aged at 60° C. for 24 hours to prepare the transparent coating layer composition.

COMPARATIVE EXAMPLE 2

A transparent conductive layer was formed in the same manner as in example 1 except that the transparent coating layer composition was prepared as follows.

2.67 g tetramethyl orthosilicate was added into a solvent mixture containing 50 g ethanol, 30 g methanol, 10 g isopropyl alcohol, and 7.25 g n-butanol, followed by pH adjustment using nitric acid to pH 2. The mixture was stirred and aged at 60° C. for 24 hours to prepare the transparent coating layer composition.

Sheet resistance and film hardness were measured using the transparent conductive layers formed in examples 1 through 3 and comparative examples 1 and 2. The results are shown in Table 1 below. Sheet resistance was measured using a 4-point probe method, and film hardness was measured using a pencil hardness method.

TABLE 1

| Example | Film hardness | Sheet resistance (k$\Omega$/cm$^2$) |
| --- | --- | --- |
| Example 1 | 7 H | 1.5 |
| Example 2 | 7 H | 1.4 |
| Example 3 | 7 H | 0.25 |
| Comparative example 1 | 7 H | 5 |
| Comparative example 2 | 7 H | 0.9 |

As is apparent from Table 1, the transparent conductive layers of examples 1 through 3 showed improvements in sheet resistance and film hardness, compared to the transparent conductive layers of comparative examples 1 and 2.

A quality transparent conductive layer which is less reflective and has a low resistance and strong film hardness can be formed using the transparent conductive layer composition according to the present invention at lower cost than in the prior art. The transparent conductive layer can be used on the front panel surface of an electrical image display device, such as a cathode ray tube, a vacuum fluorescent display, a plasma display, and a liquid crystal display. When the transparent conductive layer according to the present invention is formed on the front panel surface of such a display device, the transparent conductive layer providing a sheet resistance of $10^1$–$10^4$ $\Omega$/cm$^2$, and more accurately, about $10^3$ $\Omega$/cm$^2$, can effectively shield electromagnetic waves and an electromagnetic field formed due to the emission of electromagnetic waves.

While the present invention has been particularly shown and described with reference to preferred embodiments thereof, it will be understood by those of ordinary skill in the art that various changes in form and details may be made therein without departing from the spirit and scope of the present invention as defined by the following claims.

What is claimed is:

1. A composition for a transparent conductive layer including a conductive layer and a transparent coating layer formed on the conductive layer, wherein a transparent coating layer composition for the transparent coating layer comprises an amine compound having one of formule (1) and (2) below, a metal compound having formula (3) below, and a polar solvent, and the amount of the amine compound is in the range of 0.001–5.0 parts by weight based on 100 parts of the metal compound having said formula (3) by weight:

$$R_1(NH_2)_n \quad (1)$$

where n is an integer of 1 or 2, $R_1$ is selected from the group consisting of $C_1$–$C_{20}$ alkyl groups, a phenyl group, $C_2$–$C_{20}$ alkenyl groups, $C_1$–$C_{20}$ alkyl groups with a hydroxy group, and —$(CH_2)_k SO_3 H$, where k is an integer from 1 to 10, $$(R_2O)_x—Si(OR_3)_{3-x}—R_4 \quad (2)$$

where x is an integer from 1 to 3, $R_2$ and $R_3$ are each independently selected from the group consisting of $C_1$–$C_{20}$ alkyl groups and a phenyl group, and $R_4$ is selected from the group consisting of $C_1$–$C_{20}$ alkyl groups with a substituted or unsubstituted amino group, a phenyl group with a substituted or unsubstituted amino group, and $C_6$–$C_{50}$ aryl groups with a substituted or unsubstituted amino group, where M is selected from the group consisting of silicon, titanium, tin, and zirconium; $R_6$ is a $C_1$–$C_{20}$ alkyl group or —$M(R_{12}R_{13}R_{14})$, where $R_{12}$, $R_{13}$, and $R_{14}$ are each independently selected from the group consisting of $C_1$–$C_{20}$ alkyl groups, $C_1$–$C_{20}$ alkoxy groups, and $C_6$–$C_{20}$ aryl groups; $R_7$ is a $C_1$–$C_{20}$ alkyl group; $R_8$ and $R_9$ are selected from the group consisting of $C_1$–$C_{20}$ alkyl groups, $C_1$–$C_{20}$ alkoxy groups, $C_2$–$C_{20}$ alkenyl groups, and $C_6$–$C_{20}$ aryl groups, at least one of $R_8$ and $R_9$ being a $C_1$–$C_{20}$ alkoxy group; $R_{10}$ and $R_{11}$ are selected from the group consisting of $C_1$–$C_{20}$ alkyl groups, $C_2$–$C_{20}$ alkenyl groups, and $C_6$–$C_{20}$ aryl groups, at least one of $R_{10}$ and $R_{11}$ is a $C_1$–$C_{20}$ alkoxy group; and n is an integer from 0 to 20.

2. The composition of claim 1, wherein the transparent coating layer composition further comprises a mercapto compound having one of formula (4) and (5) below:

where $R_{15}$ is selected from the group consisting of $C_1$–$C_{20}$ alkyl groups, $C_1$–$C_{20}$ alkyl groups with a hydroxy group, hydroxy-substituted $C_1$–$C_{20}$ hydroxyalkyl groups, and —$(CH_2)_k$COOH, where k is an integer from 1 to 10, where $R_{16}$ is a $C_1$–$C_{20}$ alkyl group, $R_{17}$ and $R_{18}$ are each independently selected from the group consisting of $C_1$–$C_{20}$ alkyl groups, $C_1$–$C_{20}$ alkoxy groups, and $C_1$–$C_{20}$ alkyl groups with a mercapto group, and $R_{19}$ is a $C_1$–$C_{20}$ alkyl group with a mercapto group.

3. The composition of claim 2, wherein the mercapto compound is at least one selected from the group consisting of mercaptopropyltrimethoxysilane, 3-mercaptopropylmethyldimethoxysilane, 3-mercapto-1,2-propanediol, 1-mercapto-2-propanol, and 3-mercaptopropionic acid.

4. The composition of claim 1, wherein the amine compound is at least one selected from the group consisting of 3-aminopropyltrimethoxysilane, N-(6-aminoethyl)-3-aminopropyltrimethoxysilane, p-aminophenyltrimethoxysilane, 2-amino-1-propanol, 1-amino-2-propanol, 3-amino-1-propanesulfonic acid, ethylenediamine, and 1,2-diaminopropane.

5. The composition of claim 2 wherein the amount of the mercapto compound is in the range of 0.001–5.0 parts by weight based on 100 parts of the metal compound having said formula (3) by weight.

6. The composition of claim 1, wherein the metal compound having said formula (3) is at least one selected from the group consisting of tetraethyl orthosilicate and its oligomers, tetramethylorthosilicate and its oligomers, tetraisopropyl orthosilicate, methyl trimethoxysilicate, vinyltriethoxysilane, phenyltriethoxysilane, and 3-glycidoxypropyltrimethoxysilane.

7. The composition of claim 1, wherein the polar solvent is at least one selected from the group consisting of water, ethanol, methanol, butanol, methylcellosolve, and isopropylcellosolve, and the amount of the polar solvent is in the range of 1–10,000 parts by weight based on 1 part of the metal oxide having said formula (3) by weight.

8. The composition of claim 1, wherein a conductive layer composition for the conductive layer comprises at least one of metal and metal oxide having an average particle diameter of 5–5000 nm and a polar solvent.

9. The composition of claim 8, wherein the metal is at least one selected from the group consisting of gold, silver, palladium, platinum, rhodium, ruthenium, copper, iron, nickel, cobalt, tin, titanium, indium, aluminium, tantalum, and antimony, the metal oxide is at least one selected from the group consisting of tin-doped indium oxide, antimony-doped tin oxide, titanium oxide, and ruthenium oxide, and the amount of the at least one of the metal and metal oxide is in the range of 0.01–20 parts by weight based on 100 parts of the conductive layer composition by weight.

10. The composition of claim 8, wherein the polar solvent comprised in a conductive layer composition for the conductive layer is at least one selected from the group consisting of water, ethanol, methanol, butanol, methylcellosolve, and isopropylcellosolve, and the amount of the polar solvent is in the range of 80–99.99 parts by weight based on 100 parts of the conductive layer composition by weight.

11. The composition of claim 1, wherein the transparent coating layer composition or the conductive layer composition further comprises at least one colorant selected from the group consisting of carbon black, graphite, titan black, TiN, $TiO_{1-x}N_x$, where 0<x<1, TiC, TiN—TiC, cobalt oxide, zinc oxide, iron oxide, ruthenium oxide, aluminium oxide, metallic complex azo dye, metallic complex anthraquinon dye, and a mixture of at least two thereof.

12. The composition of claim 8, wherein the transparent coating layer composition or the conductive layer composition further comprises at least one colorant selected from the group consisting of carbon black, graphite, titan black, TiN, $TiO_{1-x}N_x$, where 0<x<1, TiC, TiN—TiC, cobalt oxide, zinc oxide, iron oxide, ruthenium oxide, aluminium oxide, metallic complex azo dye, metallic complex anthraquinon dye, and a mixture of at least two thereof.

13. A transparent conductive layer comprising:

a product obtained by coating and thermally treating a transparent coating layer composition containing an amine compound having one of formula (1) and (2) below, a metal compound having formula (3) below, and a polar solvent, and the amount of the amine compound is in the range of 0.001–5.0 parts by weight based on 100 carts of the metal compound having said formula (3) by weight; and a product obtained by coating and drying a conductive layer composition containing at least one of metal and metal oxide having an average particle diameter of 5–5000 nm and a polar solvent:

where n is an integer of 1 or 2, $R_1$ is selected from the group consisting of $C_1$–$C_{20}$ alkyl groups, a phenyl group, $C_2$–$C_{20}$ alkenyl groups, $C_1$–$C_{20}$ alkyl groups with a hydroxy group, and —$(CH_2)_k SO_3H$, where k is an integer from 1 to 10, where x is an integer from 1 to 3, $R_2$ and $R_3$ are each independently selected from the group consisting of $C_1$–$C_{20}$ alkyl groups and a phenyl group, and $R_4$ is selected from the group consisting of $C_1$–$C_{20}$ alkyl groups with a substituted or unsubstituted amino group, a phenyl group with a substituted or unsubstituted amino group, and $C_6$–$C_{50}$ aryl groups with a substituted or unsubstituted amino group, where M is selected from the group consisting of silicon, titanium, tin, and zirconium; $R_6$ is a $C_1$–$C_{20}$ alkyl group or —$M(R_{12}R_{13}R_{14})$, where $R_{12}$, $R_{13}$, and $R_{14}$ are each independently selected from the group consisting of $C_1$–$C_{20}$ alkyl groups, $C_1$–$C_{20}$ alkoxy groups, and $C_6$–$C_{20}$ aryl groups; $R_7$ is a $C_1$–$C_{20}$ alkyl group; $R_8$ and $R_9$ are selected from the group consisting of $C_1$–$C_{20}$ alkyl groups, $C_1$–$C_{20}$ alkoxy groups, $C_2$–$C_{20}$ alkenyl groups, and $C_6$–$C_{20}$ aryl groups, at least one of $R_8$ and $R_9$ being a $C_1$–$C_{20}$ alkoxy group; $R_{10}$ and $R_{11}$ are selected from the group consisting of $C_1$–$C_{20}$ alkyl groups, $C_2$–$C_{20}$ alkenyl groups, and $C_6$–$C_{20}$ aryl groups, at least one of $R_{10}$ and $R_{11}$ is a $C_1$–$C_{20}$ alkoxy group; and n is an integer from 0 to 20.

14. The transparent conductive layer of claim 13, having a single layered structure.

15. The transparent conductive layer of claim 13, wherein at least one colorant selected from the group consisting of carbon black, graphite, titan black, TiN, $TiO_{1-x}N_x$, where 0<x<1, TiC, TiN—TiC, cobalt oxide, zinc oxide, iron oxide, ruthenium oxide, aluminium oxide, metallic complex azo dye, metallic complex anthraquinon dye, and a mixture of at least two of the foregoing materials is further incorporated into the transparent conductive layer.

16. The transparent conductive layer of claim 14, wherein at least one colorant selected from the group consisting of carbon black, graphite, titan black, TiN, where 0<x<1, TiC, TiN—TiC, cobalt oxide, zinc oxide, iron oxide, ruthenium oxide, aluminium oxide, metallic complex azo dye, metallic complex anthraquinon dye, and a mixture of at least two of the foregoing materials is further incorporated into the transparent conductive layer.

17. The transparent conductive layer of claim 13, having a dual-layered structure including a conductive layer and a transparent coating layer on the conductive layer,
wherein the transparent coating layer is formed by coating and thermally treating the transparent coating layer composition containing the amine compound having one of said formula (1) and (2), the metal compound having said formula (3), and the polar solvent, and the amount of the amine compound is in the range of 0.001–5.0 parts by weight based on 100 parts of the metal compound having said formula (3) by weight, and the conductive layer is formed by coating and drying the conductive layer composition containing the at least one of metal and metal oxide having an average particle diameter of 5–5000 nm and the polar solvent.

18. The transparent conductive layer of claim 13, wherein the transparent coating layer composition further comprises a mercapto compound having one of formula (4) and (5) below:

where $R_{15}$ is selected from the group consisting of $C_1$–$C_{20}$ alkyl groups, $C_1$–$C_{20}$ alkyl groups with a hydroxy group, hydroxy-substituted $C_1$–$C_{20}$ hydroxyalkyl groups, and —$(CH_2)_k$COOH, where k is an integer from 1 to 10, where $R_{16}$ is a $C_1$–$C_{20}$ alkyl group, $R_{17}$ and $R_{18}$ are each independently selected from the group consisting of $C_1$–$C_{20}$ alkyl groups, $C_1$–$C_{20}$ alkoxy groups, and $C_1$–$C_{20}$ alkyl groups with a mercapto group, and $R_{19}$ is a $C_1$–$C_{20}$ alkyl group with a mercapto group.

19. The transparent conductive layer of claim 17, wherein the transparent coating layer composition further comprises a mercapto compound having one of formula (4) and (5) below:

where $R_{15}$ is selected from the group consisting of $C_1$–$C_{20}$ alkyl groups, $C_1$–$C_{20}$ alkyl groups with a hydroxy group, hydroxy-substituted $C_1$–$C_{20}$ hydroxyalkyl groups, and —$(CH_2)_k$COOH, where k is an integer from 1 to 10, where $R_{16}$ is a $C_1$–$C_{20}$ alkyl group, $R_{17}$ and $R_{18}$ are each independently selected from the group consisting of $C_1$–$C_{20}$ alkyl groups, $C_1$–$C_{20}$ alkoxy groups, and $C_1$–$C_{20}$ alkyl groups with a mercapto group, and $R_{19}$ is a $C_1$–$C_{20}$ alkyl group with a mercapto group.

20. The transparent conductive layer of claim 17, wherein the transparent coating layer contains at least one of the amine compound having one of said formula (1) and (2) and the hydrolyzed and polycondensated product of the amine compound, and the hydrolyzed and polycondensated product of the metal compound having said formula (3).

21. The transparent conductive layer of claim 20, wherein the transparent coating layer further contains at least one of the mercapto compound having one of said formula (4) and (5) and the hydrolyzed and polycondensated product of the mercapto compound.

22. The transparent conductive layer of claim 17, wherein at least one colorant selected from the group consisting of carbon black, graphite, titan black, TiN, $TiO_{1-x}N_x$, where 0<x<1, TiC, TiN—TiC, cobalt oxide, zinc oxide, iron oxide, ruthenium oxide, aluminium oxide, metallic complex azo dye, metallic complex anthraquinon dye, and a mixture of at least two of the foregoing materials is further incorporated into the conductive layer.

23. A method for forming a transparent conductive layer, the method comprising:
forming a conductive layer by coating and drying a conductive layer composition containing at least one of metal and metal oxide having an average particle diameter of 5–5000 nm and a polar solvent; and
forming a transparent coating layer by coating and thermally treating a transparent coating layer composition containing an amine compound having one of formula (1) and (2) below, a metal compound having formula (3) below, and a polar solvent, and the amount of the amine compound is in the range of 0.001–5.0 parts by weight based on 100 parts of the metal compound having said formula (3) by weight:
where n is an integer of 1 or 2, $R_1$ is selected from the group consisting of $C_1$–$C_{20}$ alkyl groups, a phenyl group, $C_2$–$C_{20}$ alkenyl groups, $C_1$–$C_{20}$ alkyl groups with a hydroxy group, and —$(CH_2)_k SO_3H$, where k is an integer from 1 to 10, where x is an integer from 1 to 3, $R_2$ and $R_3$ are each independently selected from the group consisting of $C_1$–$C_{20}$ alkyl groups and a phenyl group, and $R_4$ is selected from the group consisting of $C_1$–$C_{20}$ alkyl groups with a substituted or unsubstituted amino group, a phenyl group with a sub stituted or unsubstituted amino group, and $C_6$–$C_{50}$ aryl groups with a substituted or unsubstituted amino group,

(3)

where M is selected from the group consisting of silicon, titanium, tin, and zirconium; $R_6$ is a $C_1$–$C_{20}$ alkyl group or —M($R_{12}R_{13}R_{14}$), where $R_{12}$, $R_{13}$, and $R_{14}$ are each independently selected from the group consisting of $C_1$–$C_{20}$ alkyl groups, $C_1$–$C_{20}$ alkoxy groups, and $C_6$–$C_{20}$ aryl groups; $R_7$ is a $C_1$–$C_{20}$ alkyl group; $R_8$ and $R_9$ are selected from the group consisting of $C_1$–$C_{20}$ alkyl groups, $C_1$–$C_{20}$ alkoxy groups, $C_2$–$C_{20}$ alkenyl groups, and $C_6$–$C_{20}$ aryl groups, at least one of $R_8$ and $R_9$ being a $C_1$–$C_{20}$ alkoxy group; $R_{10}$ and $R_{11}$ are selected from the group consisting of $C_1$–$C_{20}$ alkyl groups, $C_2$–$C_{20}$ alkenyl groups, and $C_6$–$C_{20}$ aryl groups, at least one of $R_{10}$ and $R_{11}$ is a $C_1$–$C_{20}$ alkoxy group; and n is an integer from 0 to 20.

24. The method of claim 23, wherein the transparent coating layer composition further comprises a mercapto compound having one of formula (4) and (5) below:

$$R_{15}SH \quad (4)$$

where $R_{15}$ is selected from the group consisting of $C_1$–$C_{20}$ alkyl groups, $C_1$–$C_{20}$ alkyl groups with a hydroxy group, hydroxy-substituted $C_1$–$C_{20}$ hydroxyalkyl groups, and —(CH$_2$)$_k$COOH, where k is an integer from 1 to 10, (5)

where $R_{16}$ is a $C_1$–$C_{20}$ alkyl group, $R_{17}$ and $R_{18}$ are each independently selected from the group consisting of $C_1$–$C_{20}$ alkyl groups, $C_1$–$C_{20}$ alkoxy groups, and $C_1$–$C_{20}$ alkyl groups with a mercapto group, and $R_{19}$ is a $C_1$–$C_{20}$ alkyl group with a mercapto group.

25. The method of claim 23, wherein the thermally treating the transparent coating layer composition is performed at a temperature in the range of 100–400° C.

26. The method of claim 24, wherein the thermally treating the transparent coating layer composition is performed at a temperature in the range of 100–400° C.

27. An image display having the transparent conductive layer of claim 13.

28. The image display of claim 27, wherein the transparent conductive layer has a single layered structure of a dual layer structure including a conductive layer and a transparent coating layer on the conductive layer, the transparent coating layer formed by coating and thermally treating the transparent coating layer composition containing the amine compound having one of said formula (1) and (2), the metal compound having said formula (3), and the polar solvent.

29. A composition for a transparent conductive layer including a conductive layer and a transparent coating layer formed on the conductive layer, wherein a transparent coating layer composition for the transparent coating layer comprises an amine compound having one of formule (1) and (2) below, a metal compound having formula (3) below, and a polar solvent:

$$R_1(NH_2)_n \quad (1)$$

where n is an integer of 1 or 2, $R_1$ is selected from the group consisting of $C_1$–$C_{20}$ alkyl groups, a phenyl group, $C_2$–$C_{20}$ alkenyl groups, $C_1$–$C_{20}$ alkyl groups with a hydroxy group, and —(CH$_2$)$_k$SO$_3$H, where k is an integer from 1 to 10, $$(R_2O)_x\text{—Si}(OR_3)_{3-x}\text{—}R_4 \quad (2)$$

where x is an integer from 1 to 3, $R_2$ and $R_3$ are each independently selected from the group consisting of $C_1$–$C_{20}$ alkyl groups and a phenyl group, and $R_4$ is selected from the group consisting of $C_1$–$C_{20}$ alkyl groups with a substituted or unsubstituted amino group, a phenyl group with a substituted or unsubstituted amino group, and $C_6$–$C_{50}$ aryl groups with a substituted or unsubstituted amino group, (3)

where M is selected from the group consisting of silicon, titanium, tin, and zirconium; $R_6$ is a $C_1$–$C_{20}$ alkyl group or —M($R_{12}R_{13}R_{14}$), where $R_{12}$, $R_{13}$, and $R_{14}$ are each independently selected from the group consisting of $C_1$–$C_{20}$ alkyl groups, $C_1$–$C_{20}$ alkoxy groups, and $C_6$–$C_{20}$ aryl groups; $R_7$ is a $C_1$–$C_{20}$ alkyl group; $R_8$ and $R_9$ are selected from the group consisting of $C_1$–$C_{20}$ alkyl group $C_1$–$C_{20}$ alkoxy groups, $C_2$–$C_{20}$ alkenyl groups, and $C_6$–$C_{20}$ aryl groups, at least one of $R_8$ and $R_9$ being a $C_1$–$C_{20}$ alkoxy group; $R_{10}$ and $R_{11}$ are selected from the group consisting of $C_1$–$C_{20}$ alkyl groups, $C_2$–$C_{20}$ alkenyl groups, and $C_6$–$C_{20}$ aryl groups, at least one of $R_{10}$ and $R_{11}$ is a $C_1$–$C_{20}$ alkoxy group; and n is an integer from 0 to 20; wherein the polar solvent is at least one selected from the group consisting of water, ethanol, methanol, butanol, methylcellosolve, and isopropylcellosolve, and the amount of the polar solvent is in the range of 1–10,000 parts by weight based on 1 part of the metal oxide having said formula (3) by weight.

30. A transparent conductive layer comprising:
a product obtained by coating and thermally treating a transparent coating layer composition containing an amine compound having one of formula (1) and (2) below, a metal compound having formula (3) below, and a polar solvent; and
a product obtained by coating and drying a conductive layer composition containing at least one of metal and metal oxide having an average particle diameter of 5–5000 nm and a polar solvent:

$$R_1(NH_2)_n \quad (1)$$

where n is an integer of 1 or 2, $R_1$ is selected from the group consisting of $C_1$–$C_{20}$ alkyl groups, a phenyl group, $C_2$–$C_{20}$ alkenyl groups, $C_1$–$C_{20}$ alkyl groups with a hydroxy group, and —(CH$_2$)$_k$SO$_3$H, where k is an integer from 1 to 10, $$(R_2O)_x\text{—Si}(OR_3)_{3-x}\text{—}R_4 \quad (2)$$

where x is an integer from 1 to 3, $R_2$ and $R_3$ are each independently selected from the group consisting of $C_1$–$C_{20}$ alkyl groups and a phenyl group, and $R_4$ is selected from the group consisting of $C_1$–$C_{20}$ alkyl groups with a substituted or unsubstituted amino group, a phenyl group with a substituted or unsubstituted amino group, and $C_6$–$C_{50}$ aryl groups with a substituted or unsubstituted amino group, (3)

where M is selected from the group consisting of silicon, titanium, tin, and zirconium; $R_6$ is a $C_1$–$C_{20}$ alkyl group or —$M(R_{12}R_{13}R_{14})$, where $R_{12}$, $R_{13}$, and $R_{14}$ are each independently selected from the group consisting of $C_1$–$C_{20}$ alkyl groups, $C_1$–$C_{20}$ alkoxy groups, and $C_6$–$C_{20}$ aryl groups; $R_7$ is a $C_1$–$C_{20}$ alkyl group; $R_8$ and $R_9$ are selected from the group consisting of $C_1$–$C_{20}$ alkyl groups, $C_1$–$C_{20}$ alkoxy groups, $C_2$–$C_{20}$ alkenyl groups, and $C_6$–$C_{20}$ aryl groups, at least one of $R_8$ and $R_9$ being a $C_1$–$C_{20}$ alkoxy group; $R_{10}$ and $R_{11}$ are selected from the group consisting of $C_1$–$C_{20}$ alkyl groups, $C_2$–$C_{20}$ alkenyl groups, and $C_6$–$C_{20}$ aryl groups, at least one of $R_{10}$ and $R_{11}$ is a $C_1$–$C_{20}$ alkoxy group; and n is an integer from 0 to 20; wherein the transparent conductive layer has a single layered structure.

31. The transparent conductive layer of claim 30, wherein at least one colorant selected from the group consisting of carbon black, graphite, titan black, TiN, $TiO_{1-x}N_x$, where $0<x<1$, TiC, TiN—TiC, cobalt oxide, zinc oxide, iron oxide, ruthenium oxide, aluminium oxide, metallic complex azo dye, metallic complex anthraquinon dye, and a mixture of at least two of the foregoing materials is further incorporated into the transparent conductive layer.

* * * * *